(12) United States Patent
Abbott

(10) Patent No.: US 11,931,998 B2
(45) Date of Patent: Mar. 19, 2024

(54) MOVEABLE AND WEARABLE ITEMS, AND SYSTEMS AND METHODS FOR MONITORING OR CONTROLLING SUCH ITEMS

(71) Applicant: Rasei Limited, London (GB)

(72) Inventor: Stuart John Abbott, Hampshire (GB)

(73) Assignee: Rasei Limited, London (GB)

( * ) Notice: Subject to any disclaimer, the term of this patent is extended or adjusted under 35 U.S.C. 154(b) by 617 days.

(21) Appl. No.: 17/257,555

(22) PCT Filed: Jul. 2, 2019

(86) PCT No.: PCT/EP2019/067768
§ 371 (c)(1),
(2) Date: Dec. 31, 2020

(87) PCT Pub. No.: WO2020/007877
PCT Pub. Date: Jan. 9, 2020

(65) Prior Publication Data
US 2021/0362463 A1    Nov. 25, 2021

(30) Foreign Application Priority Data

Jul. 2, 2018 (GB) .................................. 1810861
Jul. 2, 2018 (GB) .................................. 1810862
(Continued)

(51) Int. Cl.
*B32B 5/02* (2006.01)
*B32B 5/26* (2006.01)
*G01D 11/24* (2006.01)

(52) U.S. Cl.
CPC .............. *B32B 5/024* (2013.01); *B32B 5/263* (2021.05); *G01D 11/245* (2013.01);
(Continued)

(58) Field of Classification Search
CPC .......... B32B 2250/24; B32B 2260/023; B32B 2260/046; B32B 2262/106;
(Continued)

(56) References Cited

U.S. PATENT DOCUMENTS 7,540,342 B1    6/2009  Ein
9,919,712 B1    3/2018  Doyen et al.
(Continued)

FOREIGN PATENT DOCUMENTS

CA    2235309 A1    10/1999
CN    205921077 U    2/2017
(Continued)

OTHER PUBLICATIONS

Akyildiz, I.F., et al., Electromagnetic wireless nanosensor networks, Nano communication networks 1, 2010, pp. 3-19, Elsevier (2010).
(Continued)

*Primary Examiner* — Andre J Allen
(74) *Attorney, Agent, or Firm* — UltimatEdge IP Law Group, P.C.; Dean G. Stathakis

(57) ABSTRACT

An item comprising a body which comprises a fiber composite structure incorporating at least one sensor for sensing a parameter and/or at least one antenna for wireless communication, and circuitry, wherein the fiber composite structure is formed of a plurality of structural layers or laminations which are formed from a sheet which is impregnated with a graphene-containing resin.

20 Claims, 6 Drawing Sheets

(30) Foreign Application Priority Data

| Jul. 2, 2018 | (GB) | 1810863 |
|---|---|---|
| Jul. 2, 2018 | (GB) | 1810864 |
| Jul. 2, 2018 | (GB) | 1810865 |

(52) U.S. Cl.
CPC ... *B32B 2260/023* (2013.01); *B32B 2260/046* (2013.01); *B32B 2262/106* (2013.01); *B32B 2307/202* (2013.01); *B32B 2307/204* (2013.01); *B32B 2307/56* (2013.01); *B32B 2437/00* (2013.01); *B32B 2605/08* (2013.01); *B32B 2605/10* (2013.01); *B32B 2605/18* (2013.01)

(58) Field of Classification Search
CPC ........ B32B 2307/202; B32B 2307/204; B32B 2307/558; B32B 2307/56; B32B 2437/00; B32B 2451/00; B32B 2605/08; B32B 2605/10; B32B 2605/18; B32B 5/024; B32B 5/26; B32B 5/263; G01D 11/245; G01D 11/30; G01D 21/00

USPC .......................................................... 73/159

See application file for complete search history.

(56) References Cited

U.S. PATENT DOCUMENTS

| 10,045,439 | B2* | 8/2018 | Longinotti-Buitoni ................ D06M 15/263 |
|---|---|---|---|
| 10,258,092 | B2* | 4/2019 | Longinotti-Buitoni ................ D06M 15/564 |
| 10,982,751 | B2* | 4/2021 | Wesling ................. B62M 9/132 |
| 2008/0122596 | A1 | 5/2008 | Montagnon et al. |
| 2013/0034724 | A1 | 2/2013 | Sodano |
| 2013/0161926 | A1 | 6/2013 | Senechal |
| 2014/0292357 | A1 | 10/2014 | Chai |
| 2015/0130153 | A1 | 5/2015 | Chen et al. |
| 2015/0211815 | A1 | 7/2015 | Sauer et al. |
| 2015/0362997 | A1 | 12/2015 | Hatton |
| 2016/0046294 | A1 | 2/2016 | Lee et al. |
| 2016/0194460 | A1 | 7/2016 | Humfeld |
| 2016/0259422 | A1 | 9/2016 | Funase |
| 2016/0353724 | A1 | 12/2016 | Miller et al. |
| 2017/0166054 | A1 | 6/2017 | Ayala Rodriguez et al. |
| 2019/0132948 | A1* | 5/2019 | Longinotti-Buitoni ................ A61B 5/743 |
| 2019/0247650 | A1* | 8/2019 | Tran ...................... A61N 1/3704 |
| 2021/0185866 | A1* | 6/2021 | Pu ........................... B32B 27/34 |
| 2021/0195732 | A1* | 6/2021 | Longinotti-Buitoni ................ H05K 3/361 |
| 2022/0176829 | A1* | 6/2022 | Haugen ................... B60L 3/106 |

FOREIGN PATENT DOCUMENTS

| DE | 102008054210 A1 | 6/2009 |
|---|---|---|
| EP | 3128202 A1 | 2/2017 |
| IN | 105172794 A | 12/2015 |
| JP | 2002-165769 A | 6/2002 |
| JP | 2005109870 A | 4/2005 |
| JP | 2016-41572 A | 3/2016 |
| JP | 3212742 U | 9/2017 |
| JP | 2018-512302 A | 5/2018 |
| WO | 2016142147 A1 | 9/2016 |
| WO | 2018081338 A1 | 5/2018 |

OTHER PUBLICATIONS

Chiacchiarelli, Lionel M, et al., The role of irreversible and reversible phenomena in the piezoresistive behaviours of graphene epoxy nanocomposites applies to structural health monitoring, Composites Science and Technology, Elsevier, Amsterdam, NL, vol. 80, Mar. 18, 2013, pp. 73-79 (2013).

UKIPO, Search Report for GB1810863.9, pp. 2 (dated Nov. 12, 2018).

UKIPO, Search Report for GB1810864.7, p. 1 (dated Nov. 12, 2018).

WIPO, PCT Form ISA210, International Search Report for PCT/EP2019/067768, pp. 4 (dated Oct. 22, 2019).

WIPO, PCT Form ISA237, Written Opinion for PCT/EP2019/067768, pp. 8 (dated Oct. 22, 2019).

* cited by examiner

MOVEABLE AND WEARABLE ITEMS, AND SYSTEMS AND METHODS FOR MONITORING OR CONTROLLING SUCH ITEMS

CROSS-REFERENCES TO RELATED APPLICATIONS

This application is a 35 U.S.C. § 371 U.S. national stage patent application which claims the benefit of priority and is entitled to the filing date of International Patent Application PCT/EP2019/067768, filed Jul. 2, 2019, which claims the benefit of priority and is entitled to the filing date of GB 1810861.3, filed Jul. 2, 2018, GB 1810862.1, filed Jul. 2, 2018, GB 1810863.9, filed Jul. 2, 2018, GB 1810864.7, filed Jul. 2, 2018, GB 1810865.4, filed Jul. 2, 2018, the content of each of which is hereby incorporated by reference in its entirety.

BACKGROUND

Field

The present invention relates to movable items and wearable items worn by users of the same, and systems and methods for monitoring or controlling operation of movable items, in particular propelled items, including walking aids, wheelchairs and vehicles, such as bicycles, cars, for example, performance cars, such as an FI or race car, motorbikes, for example, a performance motorbike, such a race motorbike, trains or aircraft, such as an airliner or fighter plane.

The measurement of parameters relating to the function of propelled items and users thereof is currently done, and utilized in an ad hoc manner to assess performance.

The present inventor has devised movable items, in particular propelled items, and components for the same, and systems and methods for monitoring or controlling operation of movable items, recognizing that the integration of circuitry and components, including functional elements, can be done in the structural lay-up of fiber composite structures.

SUMMARY

In one aspect the present invention provides a system or method for monitoring or controlling operation of a movable item, the system or method comprising a movable item, and a processing unit which receives information from the movable item, processes the received information and provides information relating to operation of the movable item.

In one aspect the present invention provides a system or method for monitoring or controlling operation of a movable item, the system or method comprising a wearable item which is worn by a user when using a movable item, and a processing unit which receives information from the wearable item, processes the received information and provides information relating to operation of the movable item.

In one aspect the present invention provides an item comprising a body which comprises a fiber composite structure incorporating at least one sensor for sensing a parameter, wherein the fiber composite structure is formed of a plurality of structural layers or laminations which are each formed from a patterned sheet which is impregnated with a graphene-containing resin.

In one aspect the present invention provides an item comprising a body which comprises a fiber composite structure incorporating at least one antenna for wireless communication, wherein the fiber composite structure is formed of a plurality of structural layers or laminations which are each formed from a patterned sheet which is impregnated with a graphene-containing resin.

In one aspect the present invention provides an item comprising a body which comprises a fiber composite structure incorporating at least one adaptive element which has a plurality of configurations and is configurable in response to at least one control input, wherein the fiber composite structure is formed of a plurality of structural layers or laminations which are each formed from a patterned sheet which is impregnated with a graphene-containing resin.

BRIEF DESCRIPTION OF THE DRAWINGS

Preferred embodiments of the present invention will now be described herein below by way of example only with reference to the accompanying drawings, in which:

FIGS. 1 to 7 illustrate a system in accordance with one embodiment of the present invention.

DETAILED DESCRIPTION

Moveable Item

Figure 1:
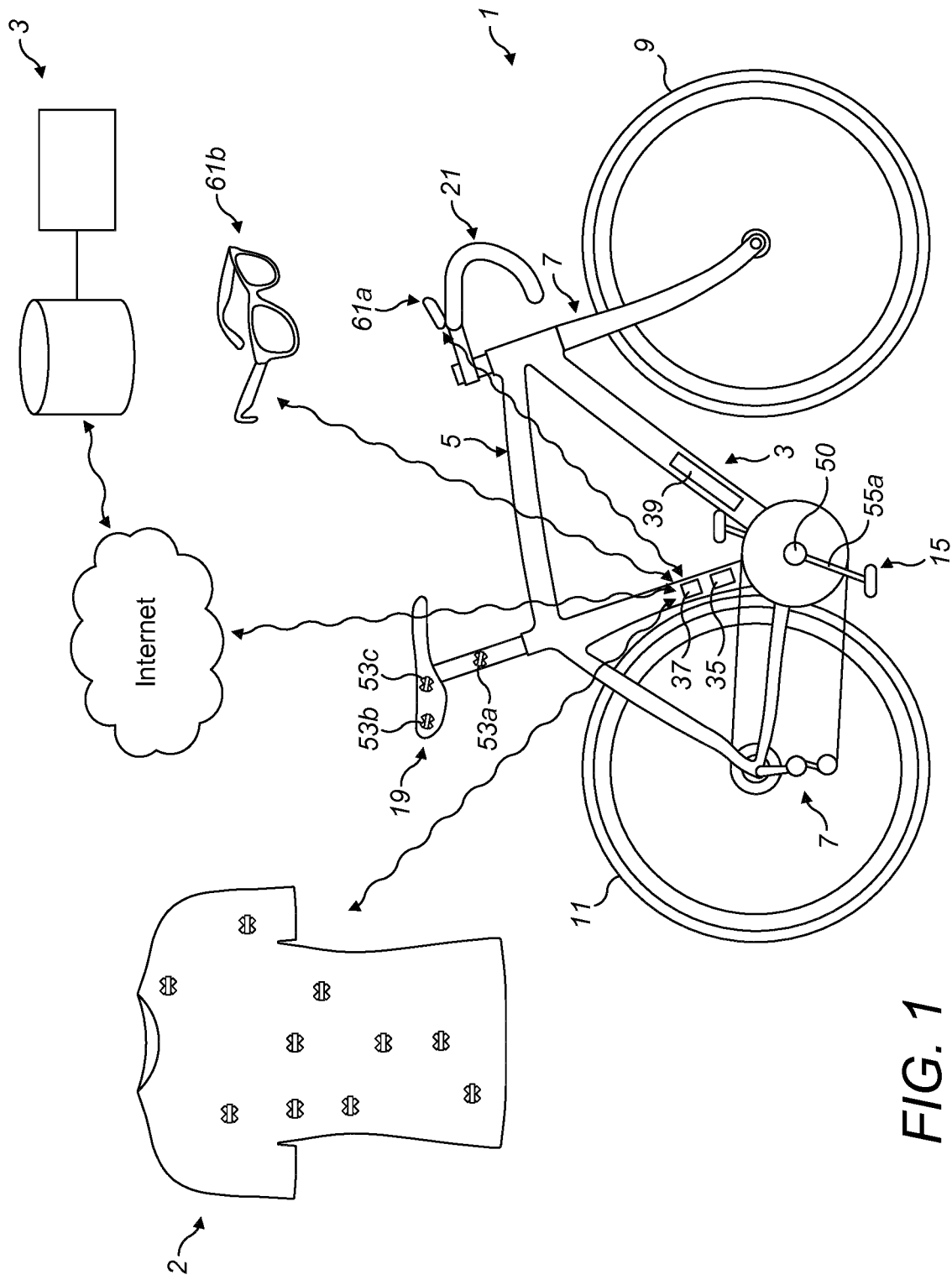
FIG. 1 illustrates a system in accordance with one embodiment of the present invention.
Figure 2:
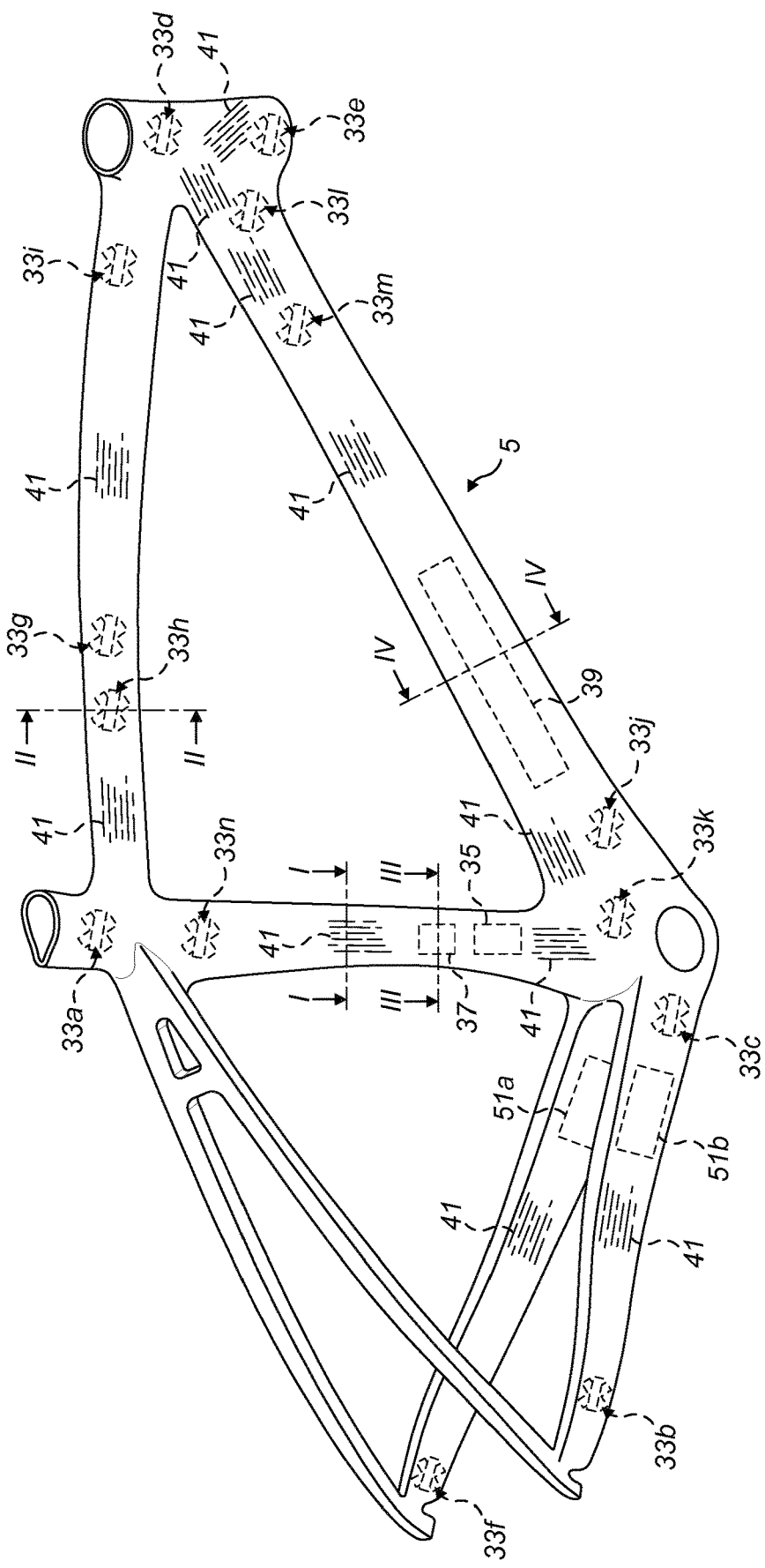
FIG. 2 illustrates the frame body of the bicycle of the bicycle system of FIG. 1.
Figure 3:
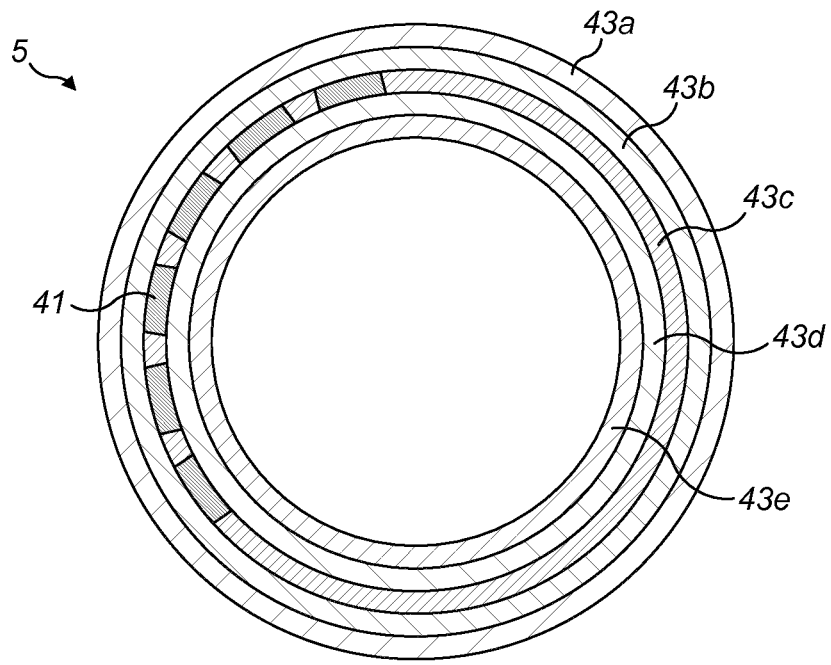
FIG. 3 illustrates a first sectional view (along section I-I in FIG. 2) through the frame body of the bicycle of FIG. 2.

In one aspect the present invention provides a system or method for monitoring or controlling operation of a movable item, the system or method comprising a movable item, and a processing unit which receives information from the movable item, processes the received information and provides information relating to operation of the movable item.

In one embodiment the movable item is a propelled item, optionally the propelled item is (i) a vehicle, optionally the vehicle is a bicycle, a car, a motorbike, a train, an aircraft or a wheelchair, or (ii) a walking aid, optionally a walking frame.

In one embodiment the propelled item is (i) a self-propelled item which is propelled by a user, or (ii) propelled by a prime mover, optionally an electric motor or a combustion engine.

In one embodiment the movable item further comprises a communicator for transmitting and/or receiving information wirelessly.

In one embodiment the movable item comprises a body which incorporates at least one sensor for sensing a parameter, optionally a plurality of sensors for sensing a plurality of parameters, optionally the body incorporates circuitry, optionally the body incorporates a power source.

In one embodiment the body comprises a fiber composite structure which incorporates the at least one sensor, optionally the fiber composite structure incorporates the circuitry and/or the power source.

In one embodiment the body includes:
(i) at least one pressure gauge, optionally a strain gauge, for measuring pressure applied to the movable item, optionally, a downward, vertical pressure;
(ii) at least one motion sensor, optionally a strain gauge, optionally a plurality of motion sensors, for measuring lateral movement of the movable item;
(iii) at least one acceleration sensor, optionally an accelerometer, for measuring acceleration of the movable item;
(iv) at least one vibration sensor, optionally an accelerometer, optionally a plurality of vibration sensors, for measuring vibration of the movable item;
(v) at least one temperature sensor, optionally a thermocouple, for measuring air temperature;
(vi) at least one humidity sensor, optionally a piezoelectric sensor, for measuring humidity;
(vii) at least one yaw sensor, optionally a gyroscope, for measuring yaw of the movable item;
(viii) at least one pitch sensor, optionally a gyroscope, for measuring pitch of the movable item;
(ix) at least one roll sensor, optionally a gyroscope, for measuring roll of the movable item;
(x) at least one wind sensor, optionally an anemometer, for measuring wind speed, optionally a plurality of wind sensors for measuring a plurality of wind speeds, optionally of head and cross winds; and/or
(xi) at least one ID sensor, optionally an RFID, for identifying the movable item.

In one embodiment the information provided by the processing unit includes at least one control input, optionally a plurality of control inputs, and the movable item, optionally body of the movable item, includes at least one adaptive element which has a plurality of configurations and is configurable in response to the at least one control input.

In one embodiment the at least one adaptive element of the movable item is formed of a structurally-adaptive material which is configurable to have a defined material characteristic in response to the at least one control input, optionally the material characteristic of the structurally-adaptive material is defined by an electrical signal, optionally the structurally-adaptive material is configurable to exhibit a defined stiffness, resilience and/or shock absorbance corresponding to the at least one control input.

In one embodiment the at least one adaptive element of the movable item comprises at least one re-configurable structural element which is configurable to have a defined structural configuration in response to the at least one control input, optionally the structural configuration is defined by an electrical signal.

In one embodiment the at least one adaptive element of the movable item comprises a movement-resisting member, optionally a ground-contact member which is contactable with the ground, optionally a braked wheel arrangement, which is configurable to provide a defined resistance to movement of the movable item, optionally the configuration of the movement-resisting member is defined by an electrical signal.

In one embodiment the movable item includes a seat in which a user sits or at least one grip member by which a user grips the movable item, and the seat or at least one grip member includes at least one sensor for sensing at least one parameter, optionally a plurality of sensors for sensing a plurality of parameters.

In one embodiment the seat or at least one grip member includes:
(i) a weight sensor, optionally a force-sensing resistor, for measuring weight of the user as applied to the seat or at least one grip member; and/or
(ii) at least one position sensor, optionally a potentiometer or linear encoder, optionally a plurality of position sensors, for sensing a position of the user on the seat or at least one grip member, optionally a first position sensor, optionally a potentiometer, for measuring a horizontal position of the user on the seat or at least one grip member, and a second position sensor, optionally a linear encoder, for measuring a lateral or center position of the user on the seat or at least one grip member.

In one embodiment the system or method further comprises at least one information unit which presents information to a user regarding performance, optionally the at least one information unit comprises:
(i) a visual display for presenting information to the user;
(ii) an audible source for presenting information to the user; and/or
(iii) a pair of glasses for presenting information to the user, optionally one or both of visual and audible information to the user.

In one embodiment the system or method further comprises a wearable item which is worn by a user and includes at least one sensor for sensing at least one parameter of the user, optionally a plurality of sensors for sensing a plurality of parameters of the user.

In one embodiment the wearable item further comprises a communicator for transmitting and/or receiving information wirelessly, optionally via a communicator of the movable item.

In one embodiment the wearable item comprises:
(i) an item of clothing, optionally a vest, a t-shirt, a pair of trousers, an undergarment or socks; and/or
(ii) a watch or jewellery, optionally a bracelet.

In one embodiment the wearable item includes:
(i) at least one temperature sensor, optionally a thermocouple, for measuring body temperature of the user;
(ii) at least one heart rate sensor, optionally an infra-red sensor, for measuring heart rate of the user;
(iii) at least one perspiration detector, optionally a piezoelectric sensor, for measuring perspiration of the user;
(iv) at least one motion sensor, optionally a strain gauge, optionally a plurality of motion sensors, for measuring movement of the user, optionally lateral movement of the user;
(v) at least one acceleration sensor, optionally an accelerometer, for measuring acceleration of the user;
(vi) at least one yaw sensor, optionally a gyroscope, for measuring yaw of the user;
(vii) at least one pitch sensor, optionally a gyroscope, for measuring pitch of the user;
(viii) at least one roll sensor, optionally a gyroscope, for measuring roll of the user; and/or
(ix) at least one ID sensor, optionally an RFID, for identifying the user.

In one embodiment the information provided by the processing unit includes at least one control input, optionally a plurality of control inputs, and the wearable item includes at least one adaptive element which has a plurality of configurations and is configurable in response to the at least one control input.

In one embodiment the at least one adaptive element of the wearable item is formed of a structurally-adaptive material which is configurable to have a defined material characteristic in response to the at least one control input, optionally the material characteristic of the structurally-adaptive material is defined by an electrical signal, optionally the structurally-adaptive material is configurable to exhibit a defined stiffness and/or resilience corresponding to the at least one control input.

In one embodiment the at least one adaptive element of the wearable item comprises at least one re-configurable element, optionally an actuator, which is configurable to have a defined configuration in response to the at least one control input, optionally the configuration is defined by an electrical signal.

In one embodiment the processing unit is configured:
(i) automatically to adjust the at least one adaptive element of the wearable item so as to control or improve the performance of the movable item; or
(ii) to prompt a user to perform at least one task, optionally a plurality of tasks, so as to control or improve the performance of the movable item, optionally the at least one task comprises:
  (a) adjustment of the at least one adaptive element of the wearable item;
  (b) adjustment of a position of a user in relation to the movable item;
  (c) re-distribution of weight of a user in relation to the movable item; and/or
  (d) adjustment of power applied by a user to the movable item in moving the movable item; and/or
  (e) adjustment of one or both of food intake of a user and/or liquid intake of a user.

In one embodiment the processing unit is a processing center which is wirelessly connected to the movable item, optionally by internet or a mobile telecommunications protocol, optionally (i) the processing unit is located in a fixed location remotely from the movable item, or (ii) the processing unit is implemented on a mobile telephone.

Wearable Item

In one aspect the present invention provides a system or method for monitoring or controlling operation of a movable item, the system or method comprising a wearable item which is worn by a user when using a movable item, and a processing unit which receives information from the wearable item, processes the received information and provides information relating to operation of the movable item.

In one embodiment the movable item is a propelled item, optionally the propelled item is (i) a vehicle, optionally the vehicle is a bicycle, a car, a motorbike, a train, an aircraft or a wheelchair, or (ii) a walking aid, optionally a walking frame.

In one embodiment the propelled item is (i) a self-propelled item which is propelled by the user, or (ii) propelled by a prime mover, optionally an electric motor or a combustion engine.

In one embodiment the wearable item further comprises a communicator for transmitting and/or receiving information wirelessly.

In one embodiment the wearable item comprises:
(i) an item of clothing, optionally a vest, a t-shirt, a pair of trousers, an undergarment or socks; and/or
(ii) a watch or jewellery, optionally a bracelet.

In one embodiment the wearable item incorporates at least one sensor for sensing a parameter, optionally a plurality of sensors for sensing a plurality of parameters, optionally the wearable item incorporates circuitry, optionally the wearable item incorporates a power source.

In one embodiment the wearable item includes:
(i) at least one temperature sensor, optionally a thermocouple, for measuring body temperature of the user;
(ii) at least one heart rate sensor, optionally an infra-red sensor, for measuring heart rate of the user;
(iii) at least one perspiration detector, optionally a piezoelectric sensor, for measuring perspiration of the user;
(iv) at least one motion sensor, optionally a strain gauge, optionally a plurality of motion sensors, for measuring movement of the user, optionally lateral movement of the user;
(v) at least one acceleration sensor, optionally an accelerometer, for measuring acceleration of the user;
(vi) at least one yaw sensor, optionally a gyroscope, for measuring yaw of the user;
(vii) at least one pitch sensor, optionally a gyroscope, for measuring pitch of the user;
(viii) at least one roll sensor, optionally a gyroscope, for measuring roll of the user; and/or
(ix) at least one ID sensor, optionally an RFID, for identifying the user.

In one embodiment the information provided by the processing unit includes at least one control input, optionally a plurality of control inputs, and the wearable item includes at least one adaptive element which has a plurality of configurations and is configurable in response to the at least one control input.

In one embodiment the at least one adaptive element of the wearable item is formed of a structurally-adaptive material which is configurable to have a defined material characteristic in response to the at least one control input, optionally the material characteristic of the structurally-adaptive material is defined by an electrical signal, optionally the structurally-adaptive material is configurable to exhibit a defined stiffness and/or resilience corresponding to the at least one control input.

In one embodiment the at least one adaptive element of the wearable item comprises at least one re-configurable element, optionally an actuator, which is configurable to have a defined configuration in response to the at least one control input, optionally the configuration is defined by an electrical signal.

In one embodiment the information provided by the processing unit includes at least one control input, optionally a plurality of control inputs, and the movable item includes at least one adaptive element which has a plurality of configurations and is configurable in response to the at least one control input.

In one embodiment the at least one adaptive element of the movable item is formed of a structurally-adaptive material which is configurable to have a defined material characteristic in response to the at least one control input, optionally the material characteristic of the structurally-adaptive material is defined by an electrical signal, optionally the structurally-adaptive material is configurable to exhibit a defined stiffness, resilience and/or shock absorbance corresponding to the at least one control input.

In one embodiment the at least one adaptive element of the movable item comprises at least one re-configurable structural element which is configurable to have a defined structural configuration in response to the at least one control input, optionally the structural configuration is defined by an electrical signal.

In one embodiment the at least one adaptive element of the movable item comprises a movement-resisting member, optionally a ground-contact member which is contactable with the ground, optionally a braked wheel arrangement, which is configurable to provide a defined resistance to movement of the movable item, optionally the configuration of the movement-resisting member is defined by an electrical signal.

In one embodiment the system or method further comprises at least one information unit which presents information to the user regarding performance, optionally the at least one information unit comprises:
 (i) a visual display for presenting information to the user;
 (ii) an audible source for presenting information to the user; and/or
 (iii) a pair of glasses for presenting information to the user, optionally one or both of visual and audible information to the user.

In one embodiment the processing unit is configured:
 (i) automatically to adjust the at least one adaptive element of one or both of the wearable item and the movable item so as to control or improve the performance of the movable item; or
 (ii) to prompt the user to perform at least one task, optionally a plurality of tasks, so as to control or improve the performance of the movable item, optionally the at least one task comprises:
  (a) adjustment of the at least one adaptive element of one or both of the wearable item and the movable item;
  (b) adjustment of a position of the user in relation to the movable item;
  (c) re-distribution of weight of the user in relation to the movable item; and/or
  (d) adjustment of power applied by the user to the movable item in moving the movable item; and/or
  (e) adjustment of one or both of food intake of the user and/or liquid intake of the user.

In one embodiment the processing unit is a processing center which is wirelessly connected to the wearable item, optionally by internet or a mobile telecommunications protocol, optionally (i) the processing unit is located in a fixed location remotely from the wearable item, or (ii) the processing unit is implemented on a mobile telephone.

Graphene Sensor

In one aspect the present invention provides an item comprising a body which comprises a fiber composite structure incorporating at least one sensor for sensing a parameter, wherein the fiber composite structure is formed of a plurality of structural layers or laminations which are each formed from a patterned sheet which is impregnated with a graphene-containing resin.

In one embodiment the fiber composite structure incorporates a plurality of sensors.

In one embodiment the fiber composite structure incorporates at least one adaptive element which has a plurality of configurations and is configurable in response to at least one control input.

In one embodiment the fiber composite structure incorporates a plurality of adaptive elements.

In one embodiment the at least one adaptive element is formed of a structurally-adaptive material which is configurable to have a defined material characteristic in response to the at least one control input, optionally the material characteristic of the structurally-adaptive material is defined by an electrical signal, optionally the structurally-adaptive material is configurable to exhibit a defined stiffness, resilience and/or shock absorbance corresponding to the at least one control input.

In one embodiment the at least one adaptive element comprises at least one re-configurable structural element which is configurable to have a defined structural configuration in response to the at least one control input, optionally the structural configuration is defined by an electrical signal.

In one embodiment the at least one adaptive element comprises a movement-resisting member, optionally a ground-contact member which is contactable with the ground, optionally a braked wheel arrangement, which is configurable to provide a defined resistance to movement of the item, optionally the configuration of the movement-resisting member is defined by an electrical signal.

In one embodiment the fiber composite structure further incorporates circuitry.

In one embodiment the fiber composite structure further incorporates at least one antenna for wireless communication which comprises conductive layers spaced by at least one dielectric layer in the fiber composite structure.

In one embodiment the fiber composite structure further incorporates a power source, optionally the power source is a capacitive battery source which stores charge and comprises conductive layers spaced by at least one dielectric layer in the fiber composite structure.

In one embodiment the sheet is a carbon fiber sheet, optionally in the form of a woven mat.

In one embodiment the at least one sensor, and optionally the at least one adaptive element, the circuitry, the at least one antenna and/or the power source, is provided by patterned conductive regions having a conductive graphene resin in the laminations which are separated by non-conductive regions having a non-conductive graphene resin.

In one embodiment the conductive regions include a resin containing more than about 5 wt % of graphene.

In one embodiment the non-conductive regions include a resin containing less than about 2 wt % of graphene.

In one embodiment ones of the laminations are patterned so as to define a shape of the conductive regions.

In one embodiment ones of the laminations are selectively impregnated with conductive and non-conductive graphene resins so as to define a shape of the conductive regions.

In one embodiment the laminations are selectively impregnated by liquid printing or deposition.

In one embodiment the graphene resin is an epoxy resin.

In one embodiment the body includes:
 (i) at least one pressure gauge, optionally a strain gauge, for measuring pressure applied to the item, optionally, a downward, vertical pressure;
 (ii) at least one motion sensor, optionally a strain gauge, optionally a plurality of motion sensors, for measuring movement of the item, optionally lateral movement of the item;
 (iii) at least one acceleration sensor, optionally an accelerometer, for measuring acceleration of the item;
 (iv) at least one vibration sensor, optionally an accelerometer, optionally a plurality of vibration sensors, for measuring vibration of the item;
 (v) at least one temperature sensor, optionally a thermocouple, for measuring air temperature;
 (vi) at least one humidity sensor, optionally a piezoelectric sensor, for measuring humidity;
 (vii) at least one yaw sensor, optionally a gyroscope, for measuring yaw of the item;

(viii) at least one pitch sensor, optionally a gyroscope, for measuring pitch of the item;

(ix) at least one roll sensor, optionally a gyroscope, for measuring roll of the item;

(x) at least one wind sensor, optionally an anemometer, for measuring wind speed, optionally a plurality of wind sensors for measuring a plurality of wind speeds, optionally of head and cross winds; and/or (xi) at least one ID sensor, optionally an RFID, for identifying the item.

In one embodiment the item is a movable item, optionally the movable item is a propelled item, optionally the propelled item is (i) a vehicle, optionally the vehicle is a bicycle, a car, a motorbike, a train, an aircraft or a wheelchair, or (ii) a walking aid, optionally a walking frame.

In one embodiment the propelled item is (i) a self-propelled item which is propelled by a user, or (ii) propelled by a prime mover, optionally an electric motor or a combustion engine.

Graphene Antenna

In one aspect the present invention provides an item comprising a body which comprises a fiber composite structure incorporating at least one antenna for wireless communication, wherein the fiber composite structure is formed of a plurality of structural layers or laminations which are each formed from a patterned sheet which is impregnated with a graphene-containing resin.

In one embodiment the fiber composite structure comprises conductive layers spaced by at least one dielectric layer in the fiber composite structure.

In one embodiment the fiber composite structure incorporates a plurality of antennae.

In one embodiment the fiber composite structure further incorporates circuitry.

In one embodiment the sheet is a carbon fiber sheet, optionally in the form of a woven mat.

In one embodiment the at least one antenna is provided by patterned conductive regions having a conductive graphene resin in the laminations which are separated by non-conductive regions having a non-conductive graphene resin.

In one embodiment the conductive regions include a resin containing more than about 5 wt % of graphene.

In one embodiment the non-conductive regions include a resin containing less than about 2 wt % of graphene.

In one embodiment ones of the laminations are patterned so as to define a shape of the conductive regions.

In one embodiment ones of the laminations are selectively impregnated with conductive and non-conductive graphene resins so as to define a shape of the conductive regions.

In one embodiment the laminations are selectively impregnated by liquid printing or deposition.

In one embodiment the graphene resin is an epoxy resin.

In one embodiment the item is a movable item, optionally the movable item is a propelled item, optionally the propelled item is (i) a vehicle, optionally the vehicle is a bicycle, a car, a motorbike, a train, an aircraft or a wheelchair, or (ii) a walking aid, optionally a walking frame.

In one embodiment the propelled item is (i) a self-propelled item which is propelled by a user, or (ii) propelled by a prime mover, optionally an electric motor or a combustion engine.

Graphene Adaptive Element

In one aspect the present invention provides an item comprising a body which comprises a fiber composite structure incorporating at least one adaptive element which has a plurality of configurations and is configurable in response to at least one control input, wherein the fiber composite structure is formed of a plurality of structural layers or laminations which are each formed from a patterned sheet which is impregnated with a graphene-containing resin.

In one embodiment the fiber composite structure comprises conductive layers spaced by at least one dielectric layer in the fiber composite structure.

In one embodiment the fiber composite structure incorporates a plurality of adaptive elements.

In one embodiment the at least one adaptive element is formed of a structurally-adaptive material which is configurable to have a defined material characteristic in response to the at least one control input, optionally the material characteristic of the structurally-adaptive material is defined by an electrical signal, optionally the structurally-adaptive material is configurable to exhibit a defined stiffness, resilience and/or shock absorbance corresponding to the at least one control input.

In one embodiment the at least one adaptive element comprises at least one re-configurable structural element which is configurable to have a defined structural configuration in response to the at least one control input, optionally the structural configuration is defined by an electrical signal.

In one embodiment the at least one adaptive element comprises a movement-resisting member, optionally a ground-contact member which is contactable with the ground, optionally a braked wheel arrangement, which is configurable to provide a defined resistance to movement of the item, optionally the configuration of the movement-resisting member is defined by an electrical signal.

In one embodiment the fiber composite structure further incorporates circuitry.

In one embodiment the sheet is a carbon fiber sheet, optionally in the form of a woven mat.

In one embodiment the at least one adaptive element is provided by patterned conductive regions having a conductive graphene resin in the laminations which are separated by non-conductive regions having a non-conductive graphene resin.

In one embodiment the conductive regions include a resin containing more than about 5 wt % of graphene.

In one embodiment the non-conductive regions include a resin containing less than about 2 wt % of graphene.

In one embodiment ones of the laminations are patterned so as to define a shape of the conductive regions.

In one embodiment ones of the laminations are selectively impregnated with conductive and non-conductive graphene resins so as to define a shape of the conductive regions.

In one embodiment the laminations are selectively impregnated by liquid printing or deposition, optionally 3D printing.

In one embodiment the graphene resin is an epoxy resin.

In one embodiment the item is a movable item, optionally the movable item is a propelled item, optionally the propelled item is (i) a vehicle, optionally the vehicle is a bicycle, a car, a motorbike, a train, an aircraft or a wheelchair, or (ii) a walking aid, optionally a walking frame.

In one embodiment the propelled item is (i) a self-propelled item which is propelled by a user, or (ii) propelled by a prime mover, optionally an electric motor or a combustion engine.

The system comprises a movable item 1 which is moved by a user, in this embodiment a propelled item which is propelled by a user, a wearable item 2 which is worn by the user, and a processing unit 3 which receives information from the propelled and wearable items 1, 2, processes the received information and transmits control information to one or both of the propelled and wearable items 1, 2.

In this embodiment the propelled item 1 is a vehicle, here a bicycle.

In another embodiment the vehicle could be a car, in particular a performance car, such as an F1 or race car, a motorbike, in particular a performance motorbike, such as a race motorbike, a train, or an aircraft, such as an airliner or fighter plane.

In this embodiment the vehicle comprises a frame 3, having a main body 5 and a front wheel support 7, front and rear wheels 9, 11 which are supported by the frame 3, a pedal assembly 15 which is in use driven by a user, a gear chain assembly 17 which connects the pedal assembly 15 and the rear wheel 11, a seat 19 on which a user in use sits, and handlebars 21 which are connected to the front wheel support 7 and by which the user steers the front wheel 9.

The body 5 comprises a fiber composite structure which incorporates a plurality of sensors 33a-33n, in this embodiment transducers, for sensing a plurality of parameters, a processor 35 for processing information received from the sensors 33a-33n, a communicator 37 for transmitting information received from the sensors 33a-33n and/or receiving control information from the processing unit 3, a power supply 39 which supplies power to the sensors 33a-33n, the processor 35 and the transmitter 37, and circuitry 41 which interconnects the sensors 33a-33n, the processor 35, the transmitter 37 and the power supply 39.

As illustrated in FIGS. 3 to 6, the fiber composite structure is formed of a plurality of structural layers or laminations 43a-43e, which are each formed from a patterned sheet which is impregnated with a graphene-containing resin.

In this embodiment the sheet is a carbon fiber sheet, here in the form of a woven mat.

The present inventor has determined that, by altering the resin composition of the laminations 43a-43e, the laminations 43a-43e provide the necessary structural support, but additionally can be rendered conductive. In this way, the laminations 43a-43e or at least regions thereof can be patterned to provide conductive regions, which are separated by non-conductive regions, and so provide the circuitry 41 and also other functional elements, such as ones of the sensors 33a-33n and the power supply 39.

FIGS. 3 to 6 illustrate representative lateral sections through the body 5, which illustrate the circuitry 41, the sensors 33a-33n, the communicator 37 and the power supply 39 as provided by conductive regions within the laminations 43a-43e.

With this configuration, the inclusion of no significant additional material beyond that necessary to confer structural support is required. In conventional systems, additional circuitry, formed of metal, would be provided by embedded wiring and discrete sensor components, all of which would introduce a significant additional weight.

In this embodiment the resin of the conductive regions contains more than about 5 wt % of graphene.

In this embodiment the resin of the non-conductive regions contains less than about 2 wt % of graphene.

In one embodiment ones of the laminations 43a-43e are patterned so as to define the shape of the conductive regions.

In another embodiment ones of the laminations 43a-43e can be selectively impregnated with the conductive and non-conductive graphene resins so as to define the shape of the conductive regions.

In one embodiment the laminations 43a-43e are selectively impregnated by liquid printing or deposition.

In this embodiment the resin is an epoxy resin.

In this embodiment the body 5 includes at least one pressure gauge 33a, such as a strain gauge, for measuring vertical pressure.

In this embodiment the body 5 includes a plurality of, here first and second motion sensors 33b, c, such as strain gauges, for measuring lateral movement.

In this embodiment the body 5 includes at least one acceleration sensor 33d, such as an accelerometer, for measuring acceleration.

In this embodiment the body 5 includes a plurality of, here first and second vibration sensors 33e, 33f, such as accelerometers, for measuring vibration.

In this embodiment the body 5 includes at least one temperature sensor 33g, such as a thermocouple, for measuring air temperature.

In this embodiment the body 5 includes at least one humidity sensor 33h, such as a piezoelectric sensor, for measuring humidity.

In this embodiment the body 5 includes at least one yaw sensor 33i, such as a gyroscope, for measuring yaw.

In this embodiment the body 5 includes at least one pitch sensor 33j, such as a gyroscope, for measuring pitch.

In this embodiment the body 5 includes at least one roll sensor 33k, such as a gyroscope, for measuring roll.

In this embodiment the body 5 includes a plurality of, here first and second wind sensors 33l, 33m, such as anemometers, for measuring head and cross winds.

In this embodiment the body 5 includes at least one ID sensor 33n, such as an RFID, for identifying the vehicle.

Figure 4:
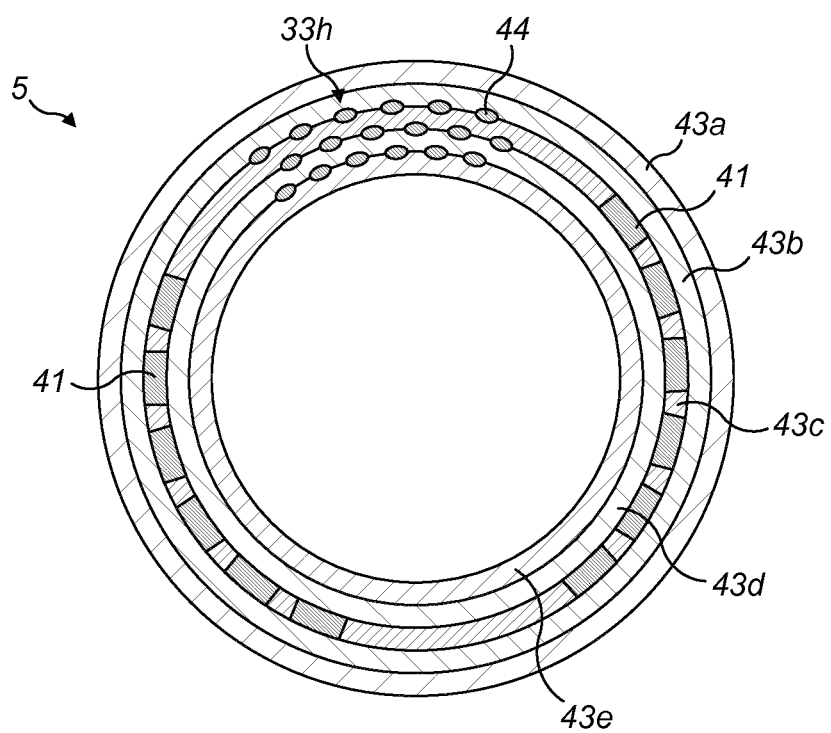
FIG. 4 illustrates a second sectional view (along section II-II in FIG. 2) through the frame body of the bicycle of FIG. 2.

In this embodiment, as represented in FIG. 4, the sensors 33a-33n are formed in part by patterned conductive regions of the laminations 43a-43e and features 44 which are deposited or printed on the laminations 43a-43e, such as by 3D printing.

In this embodiment the communicator 37 communicates via a Bluetooth® protocol, but could communicate by an alternative wireless protocol.

Figure 5:
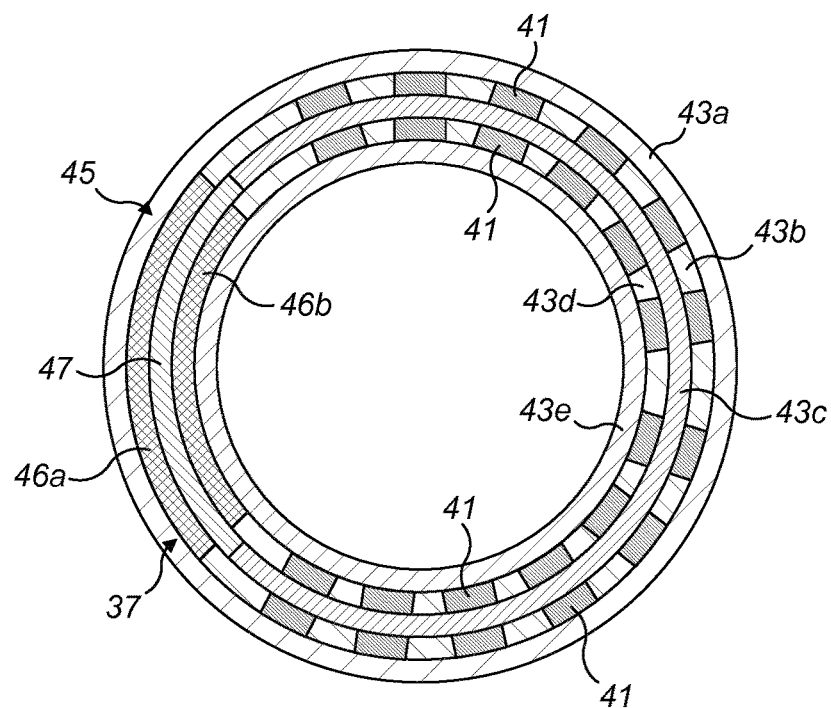
FIG. 5 illustrates a third sectional view (along section III-III in FIG. 2) through the frame body of the bicycle of FIG. 2.

In one embodiment, as represented in FIG. 5, the communicator 37 includes an antenna 45 which comprises conductive layers 46a, 46b spaced by at least one dielectric layer 47.

With this configuration, as a consequence of employing conductive graphene elements, the antenna 45 can be implemented as part of and within the structural body 5, which is not possible using a conventional carbon fiber body, as the carbon attenuates the communication signal, requiring any communications module to be external of the body 5, which can add significantly to weight. Moreover, this configuration allows for complex antenna structures, which can have large surface area, in extending over a surface of the body 5 and in allowing for multiple surface layers.

Figure 6:
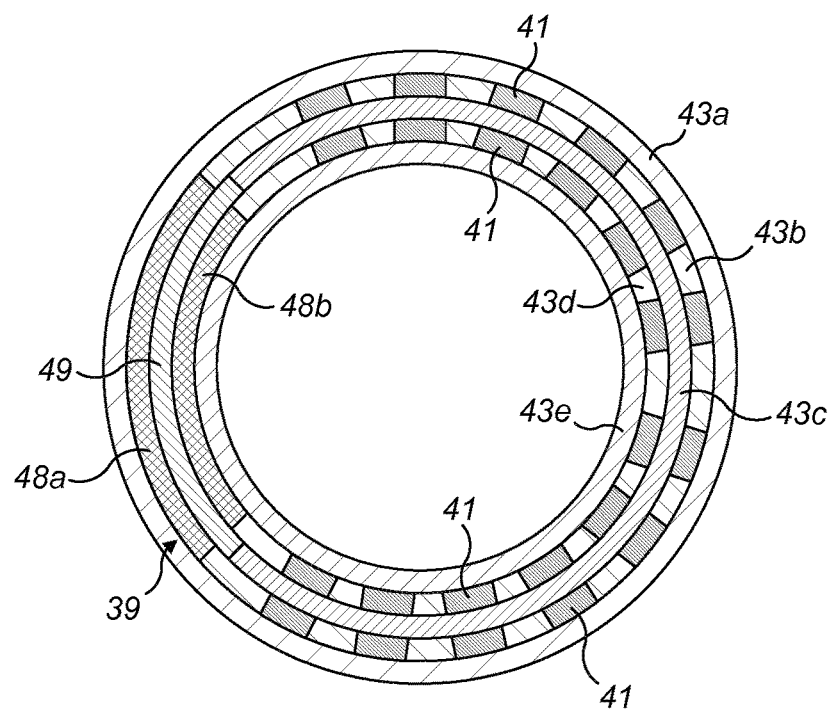
FIG. 6 illustrates a fourth sectional view (along section IV-IV in FIG. 2) through the frame body of the bicycle of FIG. 2.
Figure 7:
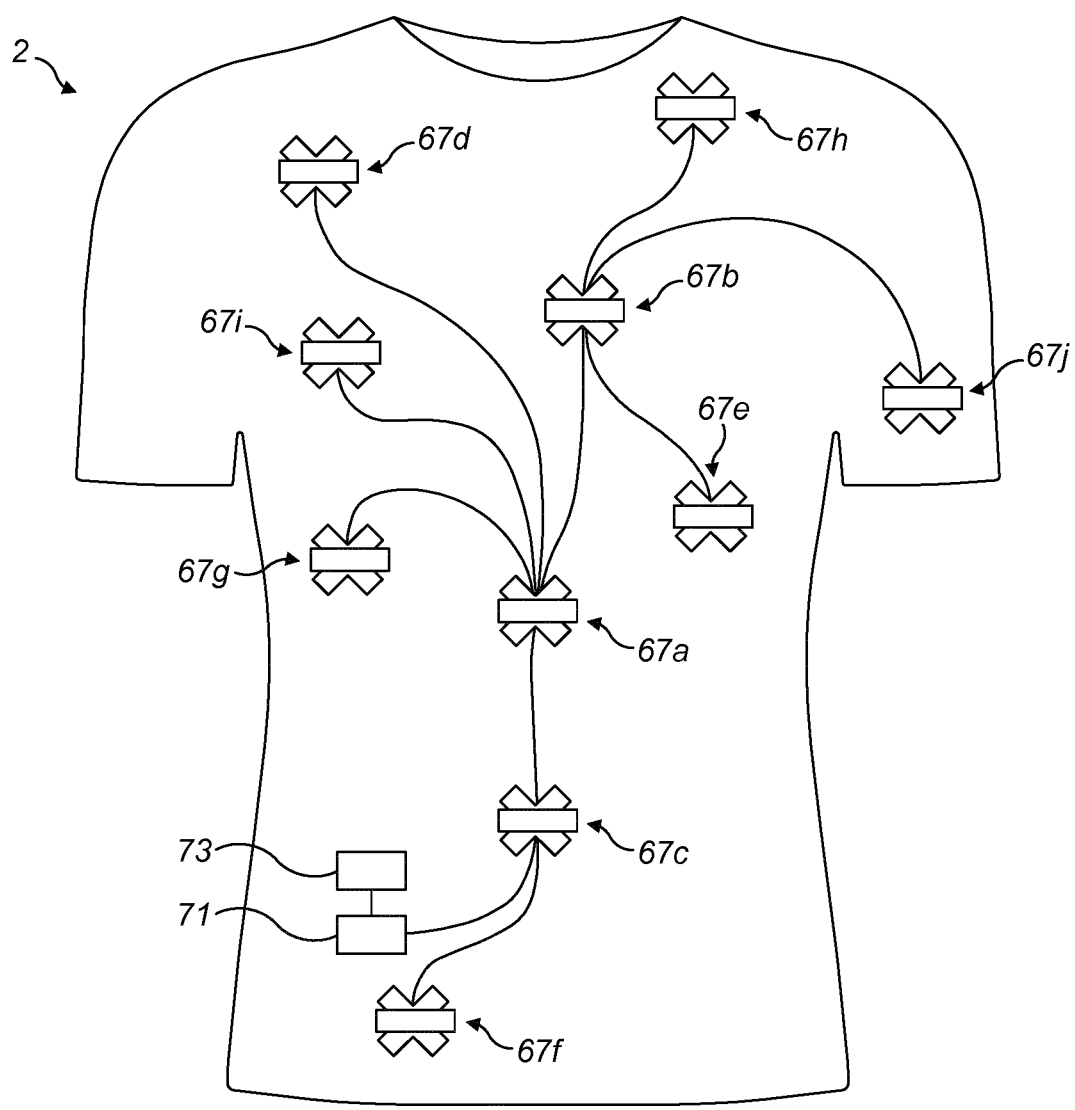
FIG. 7 illustrates the wearable item of the bicycle system of FIG. 1.

In one embodiment, as represented in FIG. 6, the power supply 39 is a capacitive battery source which stores charge and comprises conductive layers 48a, 48b spaced by at least one dielectric layer 49.

In one embodiment the power supply 39 is chargeable from an external power source.

In another embodiment the pedal assembly 15 includes a micro-generator 50 which charges the power supply 39 during use of the bicycle.

In one embodiment the power supply 39 can provide power to other components of the bicycle, such as the gear assembly 17, where the gear assembly 17 is an electrically-operated device.

In one embodiment the circuitry 41 is provided by graphene nanotubes, which can be single-walled or multi-walled nanotubes.

In this embodiment the body 5 includes a plurality of adaptive elements 51a, 51b which are formed of an adaptive material which is configurable in response to a control input to have a defined material characteristic.

In this embodiment the adaptive elements 51a, 51b are configurable in response to an electrical input.

In one embodiment the adaptive elements 51a, 51b are configurable to exhibit a defined stiffness or shock absorbance corresponding to a control input, such as sensed movement or vibration.

In this embodiment the saddle 19 includes a plurality of sensors 53a-53c for sensing a plurality of parameters.

In this embodiment the saddle 19 includes a weight sensor 53a, such as a force-sensing resistor, for measuring weight of a user.

In this embodiment the saddle 19 includes a first position sensor 53b, such as a potentiometer, for measuring a horizontal position of the user on the saddle 19, and a second position sensor 53c, such as a linear encoder, for measuring a lateral or center position of the user on the saddle 19.

In this embodiment the pedal assembly 15, here a bottom bracket of the pedal assembly 15, includes at least one sensor 55a for sensing at least one parameter.

In this embodiment the sensor 55a is a crank pressure sensor, such as a force-sensing resistor, for measuring pressure as applied to the crank by the user.

The system further comprises at least one information unit 61a, 61b which communicates, in this embodiment wirelessly, with the communicator 37 and presents information to the user regarding performance.

In this embodiment the at least one information unit 61a comprises a visual display for presenting information to a user.

In one embodiment the at least one information unit 61a could, additionally or alternatively, comprise an audible source for presenting information to a user.

In this embodiment the at least one information unit 61b comprises a pair of glasses, such as GOOGLE® glasses, for presenting information to a user, here at least one of visual or audible information to a user.

In this embodiment the wearable item 2 is an item of clothing, here a vest or t-shirt, but could be a pair of trousers, an undergarment or socks, or another wearable object, such as a watch or bracelet.

In this embodiment the wearable item 2 includes a plurality of sensors 67a-67j for sensing parameters of the user, a communicator 71 for communicating with the communicator 37 of the vehicle, and a battery 73 for powering the sensors 67a-67j and the communicator 71.

In this embodiment the wearable item 2 includes a temperature sensor 67a, such as a thermocouple, for measuring the body temperature of the user.

In this embodiment the wearable item 2 includes a heart rate sensor 67b, such as an infra-red sensor, for measuring heart rate of the user.

In this embodiment the wearable item 2 includes a perspiration detector 67c, such as a piezoelectric sensor, for measuring the perspiration of the user.

In this embodiment the wearable item 2 includes a plurality of, here first and second motion sensors 67d, 67e, such as strain gauges, for measuring lateral movement of the user.

In this embodiment the wearable item 2 includes at least one acceleration sensor 67f, such as an accelerometer, for measuring acceleration of the user.

In this embodiment the wearable item 2 includes at least one yaw sensor 67g, such as a gyroscope, for measuring yaw of the user.

In this embodiment the wearable item 2 includes at least one pitch sensor 67h, such as a gyroscope, for measuring pitch of the user.

In this embodiment the wearable item 2 includes at least one roll sensor 67i, such as a gyroscope, for measuring roll of the user.

In this embodiment the wearable item 2 includes at least one ID sensor 67j, such as an RFID, for identifying the user.

In one embodiment the processor 35 is configured automatically adjust the at least one adaptive element 51a, 51b so as to control or improve the performance of the bicycle.

In one embodiment the processor 35 is configured to prompt or recommend to the user to perform one or more tasks, such as adjustment of the at least one adaptive element 51a, 51b, the position of the user on the bicycle, the weight distribution of the user on the bicycle, the power being applied by the user through the pedal assembly 17, food intake of the user and/or liquid intake of the user, so as to control or improve the performance of the bicycle, both in the shorter and longer term.

In this embodiment the processor 35 includes an algorithm that utilizes variable output data from the sensors 33a-33n, 53a-53c, 55a, 67a-67j, which include roll, yaw, pitch and stress of the body 5, tyre pressures of the wheels 7, 9, pressure applied to the pedal set 15, applied weight on the seat 19, drag, speed and position of the vehicle, perspiration, heart rate, temperature, cadence and power of the user, air temperature, relative humidity and wind speed, and static data, such as height, weight, inside leg length and torso length of the user, size of the body 5, including top tube length and stem length, length of the crank arm of the pedal set 15 and height of the saddle 19, in order to control components of the bicycle or provide prompts to the user.

In this embodiment the processing unit 3 is a remote processing center which is wirelessly connected to the movable item 1, such as by the internet or mobile telecommunications protocol, for example GSM®.

In another embodiment the processing unit 3 could be implemented on a mobile telephone, which could be carried by the user.

In this embodiment the processing unit 3 employs one or more artificial intelligence (AI) algorithms to process received information and provide control information.

In one embodiment the AI algorithms utilize machine learning, for example, utilizing one or more of decision tree learning, inductive logic programming, clustering and reinforcement learning.

In one embodiment the AI algorithms utilize deep machine learning utilizing neural networks.

By employing machine learning, performance can be improved based on classification from the single user or a group of users, whether this be a parameter of the movable item 1, for example, in gearing selection for a defined route, such as on a bicycle, or relating to the user, in identifying an optimum training regime, such as in timing, diet or clothing.

Finally, it will be understood that the present invention has been described in its preferred embodiments and can be modified in many different ways without departing from the scope of the invention as defined by the appended claims.

Although the present invention has been exemplified in relation to a bicycle as a vehicle, the present invention extends to other vehicles, including a performance car, such as an F1 or race car, a performance motorbike, such as a race motorbike, a train and an aircraft, such as an airliner or fighter plane.

The present invention can also extend to other kinds of vehicle, such as a wheelchair.

In one embodiment the propelled item 1 need not be propelled by the user, but by another person, for example, in the case of a wheelchair, or a prime mover, such as an engine.

In addition, the present invention can extend to any propelled item 1, which need not be wheeled, such as an item having tracks or skids by which the propelled item 1 is slid, for example, a sled.

Figure 8:
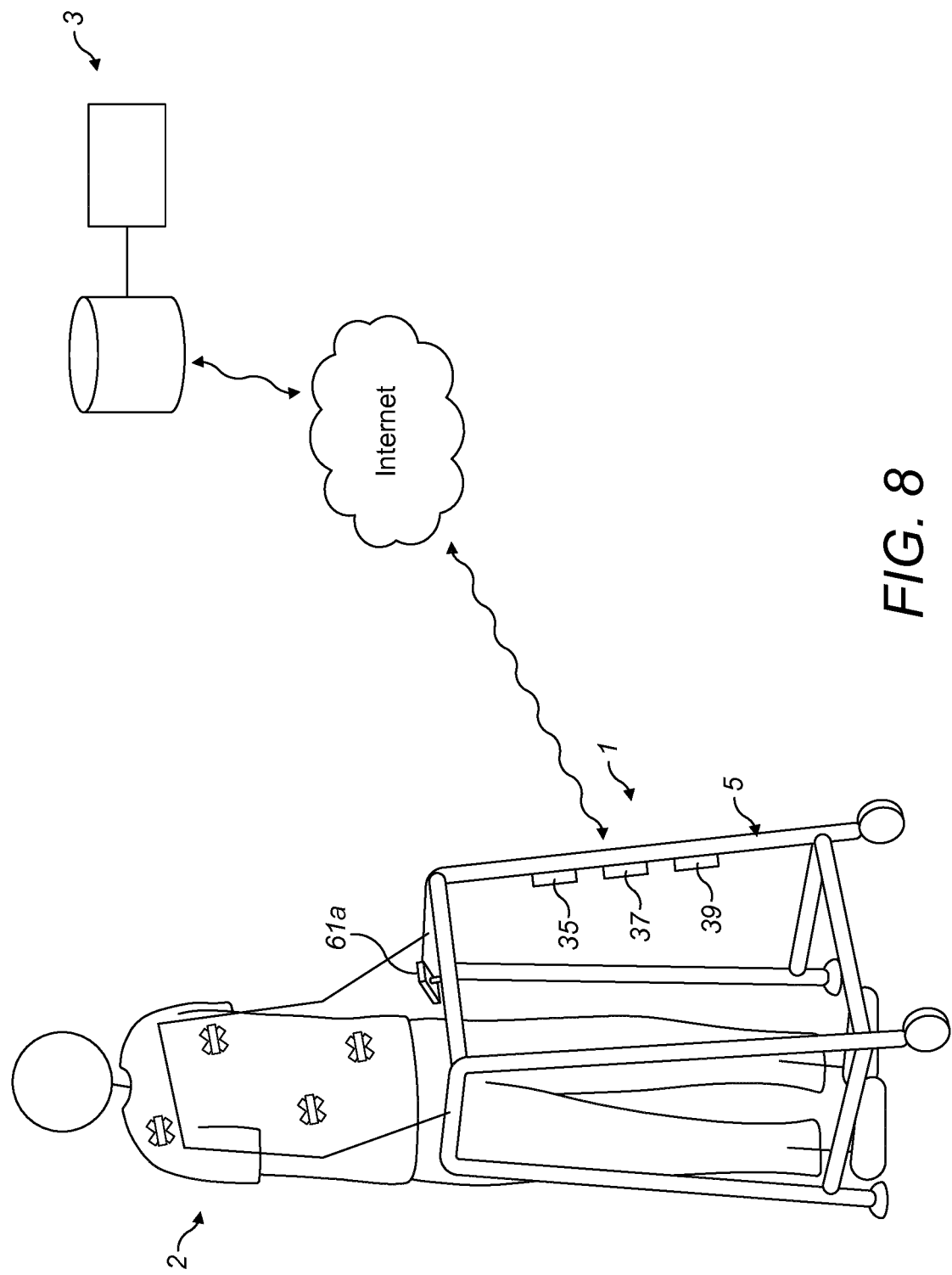
FIG. 8 illustrates a system in accordance with another embodiment of the present invention.

Moreover, the propelled item 1 can be any movement aid, such as a walking aid or walking frame, as illustrated in FIG. 8.

In this application, information received from one or both of the propelled item 1 and the wearable item 2 can be used automatically to control characteristics of the movement aid, such as to provide more or less resistance to movement or re-configuration of the body 5, such as to provide for improved posture of the user.

Furthermore, in this application, the information received from one or both of the propelled item 1 and the wearable item 2 can be provided to a practitioner who can use the received information to improve the technique, and hence mobility, of the user.

The invention claimed is:

1. An item comprising a body which comprises a fiber composite structure incorporating at least one sensor for sensing a parameter and circuitry, wherein the fiber composite structure is formed of a plurality of structural layers or laminations which are formed from a sheet which is impregnated with a graphene-containing resin, and wherein the at least one sensor and the circuitry are provided by patterned conductive regions having a conductive graphene resin in the laminations which are separated by non-conductive regions having a non-conductive graphene resin.

2. The item of claim 1, wherein the fiber composite structure incorporates a plurality of sensors.

3. The item of claim 1, wherein the fiber composite structure incorporates at least one adaptive element which has a plurality of configurations and is configurable in response to at least one control input.

4. The item of claim 1, wherein the fiber composite structure further incorporates a power source.

5. The item of claim 1, wherein the fiber composite structure further incorporates at least one antenna for wireless communication which comprises conductive layers spaced by at least one dielectric layer in the fiber composite structure.

6. The item of claim 1, wherein the fibre composite structure further incorporates at least one adaptive element, at least one antenna and a power source, and wherein the at least one adaptive element, the at least one antenna and/or the power source are provided by patterned conductive regions having a conductive graphene resin in the laminations which are separated by non-conductive regions having a non-conductive graphene resin.

7. The item of claim 1, wherein the conductive regions include a resin containing more than 5 wt % of graphene, and the non-conductive regions include a resin containing less than 2 wt % of graphene.

8. The item of claim 7, wherein the laminations are selectively impregnated by liquid printing or deposition, optionally 3D printing.

9. The item of claim 1, wherein the at least one sensor comprises:
   i, at least one pressure gauge for measuring pressure applied to the item;
   ii. at least one motion sensor for measuring lateral movement of the item;
   iii. at least one acceleration sensor for measuring acceleration of the item;
   iv. at least one vibration sensor for measuring vibration of the item;
   v. at least one temperature sensor for measuring air temperature;
   vi. at least one humidity sensor for measuring humidity;
   vii. at least one yaw sensor for measuring yaw of the item;
   viii, at least one pitch sensor for measuring pitch of the item;
   ix, at least one roll sensor for measuring roll of the item;
   x. at least one wind sensor for measuring wind speed; and/or
   xi. at least one ID sensor for identifying the item.

10. The item of claim 5, wherein the fiber composite structure incorporates a plurality of antennae.

11. The item of claim 1, wherein the sheet is a carbon fiber sheet, optionally in the form of a woven mat.

12. The item of claim 1, wherein the graphene resin is an epoxy resin.

13. The item of claim 1, wherein the item is (i) a vehicle, or (ii) a walking aid, wherein the vehicle is selected from a bicycle, a car, a motorbike, a train, an aircraft or a wheelchair.

14. A method for monitoring or controlling operation of a movable item, the method comprising the item of claim 13, and a processing unit which receives information from the movable item, processes the received information and provides information relating to operation of the movable item.

15. The method of claim 14, wherein the information provided by the processing unit includes at least one control input utilized to configure at least one adaptive element of the movable item which has a plurality of configurations configurable in response to the at least one control input.

16. The method of claim 14, wherein the movable item includes a seat in which a user sits or at least one grip member by which a user grips the movable item, and the seat or at least one grip member includes at least one sensor for sensing at least one parameter.

17. The method of claim 14, further comprising at least one information unit which presents information to a user regarding performance, wherein the at least one information unit comprises at least one of:
   i. a visual display for presenting information to the user;
   ii. an audible source for presenting information to the user; and/or
   iii. a pair of glasses for presenting information to the user.

18. The method of claim 14, further comprising a wearable item which is worn by a user and includes at least one sensor for sensing at least one parameter of the user.

19. The method of claim 14, wherein the processing unit is configured:
   i. automatically to adjust the at least one adaptive element so as to control or improve the performance of the movable item; or
   ii. to prompt a user to perform at least one task, so as to control or improve the performance of the movable item, wherein the at least one task comprises:
     a. adjustment of the at least one adaptive element;
     b. adjustment of a position of a user in relation to the movable item;
     c. re-distribution of weight of a user in relation to the movable item; and/or
     d. adjustment of power applied by a user to the movable item in moving the movable item; and/or
     e. adjustment of one or both of food intake of a user and/or liquid intake of a user.

20. The method of claim 14, wherein the processing unit is a processing center which is wirelessly connected to the movable item, optionally by Internet or a mobile telecommunications protocol, optionally (i) the processing unit is located in a fixed location remotely from the movable item, or (ii) the processing unit is implemented on a mobile telephone.

\* \* \* \* \*